US012542735B1

(12) United States Patent
Mukherjee et al.

(10) Patent No.: US 12,542,735 B1
(45) Date of Patent: Feb. 3, 2026

(54) SYSTEM AND METHOD FOR OPTIMALLY BALANCED NETWORK MULTIPATHING (71) Applicant: Enfabrica Corporation, Mountain View, CA (US)

(72) Inventors: Shrijeet Mukherjee, Mountain View, CA (US); Rachit Agarwal, Mountain View, CA (US); Leonid Okner, Mountain View, CA (US); Mike Jorda, Mountain View, CA (US); Shimon Muller, Mountain View, CA (US)

(73) Assignee: Enfabrica Corporation, Mountain View, CA (US)

( * ) Notice: Subject to any disclaimer, the term of this patent is extended or adjusted under 35 U.S.C. 154(b) by 0 days.

(21) Appl. No.: 18/920,558

(22) Filed: Oct. 18, 2024

(51) Int. Cl.
*H04L 45/24* (2022.01)
*H04L 45/28* (2022.01)
*H04L 47/125* (2022.01)

(52) U.S. Cl.
CPC .............. *H04L 45/24* (2013.01); *H04L 45/28* (2013.01); *H04L 47/125* (2013.01)

(58) Field of Classification Search
None
See application file for complete search history.

(56) References Cited

U.S. PATENT DOCUMENTS

| | | |
|---|---|---|
| 6,594,712 B1 | 7/2003 | Pettey et al. |
| 6,667,974 B1 | 12/2003 | Shigeta |
| 7,181,541 B1 | 2/2007 | Burton et al. |
| 7,191,225 B1 | 3/2007 | Borthakur |
| 7,245,586 B2 | 7/2007 | Bitar et al. |

(Continued)

FOREIGN PATENT DOCUMENTS

| | | |
|---|---|---|
| EP | 2768188 A1 | 8/2014 |
| EP | 3661141 A1 | 6/2020 |

(Continued)

OTHER PUBLICATIONS

Emulex Corporation. "Emulex provides 10Gb Ethernet Virtual Fabric Adapter 5 for New Lenovo Servers." Business Wire. Dec. 15, 2014 (Dec. 15, 2014) Retrieved on Mar. 7, 2022 (Mar. 7, 2022 from: <https://www.businesswire.com/news/home/20141215005718/en/Emulex-provides-10Gb-Ethernet-Virtual-Fabric-Adapter-5-New-Lenovo-Ervers>entire document.

(Continued)

*Primary Examiner* — Fadi Haj Said
(74) *Attorney, Agent, or Firm* — Goodwin Procter LLP (57) ABSTRACT

In general, the subject matter of this disclosure relates to a system for optimally balanced network multipathing. An example system includes a fabric adapter communicatively coupled to a plurality of network ports, a plurality of controlling hosts, and a plurality of application hosts. The fabric adapter is configured to: receive contents of one or more headers of a network packet; receive control information for the network packet, the control information describing at least one of a state of a network or a state of an application running on at least one application host from the plurality of application hosts; receive a payload of a network packet; select a network path in the network; and forward the network packet to a network port of the plurality of network ports, the network packet including the one or more headers and the payload.

20 Claims, 5 Drawing Sheets (56) References Cited

U.S. PATENT DOCUMENTS

| | | | |
|---|---|---|---|
| 7,293,129 | B2 | 11/2007 | Johnsen et al. |
| 7,697,422 | B1 | 4/2010 | Arad et al. |
| 7,937,447 | B1 | 5/2011 | Cohen et al. |
| 8,234,407 | B2 | 7/2012 | Sugumar et al. |
| 8,301,717 | B2 | 10/2012 | Deshpande |
| 8,719,456 | B2 | 5/2014 | Wilkinson |
| 8,917,734 | B1 | 12/2014 | Brown |
| 9,049,265 | B1 | 6/2015 | Greenfield et al. |
| 9,164,702 | B1 | 10/2015 | Nesbit et al. |
| 9,448,901 | B1 | 9/2016 | Aslam et al. |
| 9,648,102 | B1 | 5/2017 | Davis et al. |
| 9,684,597 | B1 | 6/2017 | Eiriksson |
| 9,864,519 | B2 | 1/2018 | Meyer et al. |
| 9,934,152 | B1 | 4/2018 | Bryant et al. |
| 10,152,428 | B1 | 12/2018 | Alshawabkeh et al. |
| 10,169,279 | B2 | 1/2019 | Yokoyama |
| 10,374,945 | B1* | 8/2019 | Dhanabalan ............ H04L 47/29 |
| 10,447,767 | B2 | 10/2019 | Baptist et al. |
| 10,503,658 | B2 | 12/2019 | Basu et al. |
| 10,778,521 | B2 | 9/2020 | Liguori et al. |
| 10,880,204 | B1* | 12/2020 | Shalev ............... H04L 47/365 |
| 10,931,588 | B1 | 2/2021 | Matthews et al. |
| 10,944,660 | B2 | 3/2021 | Hurson et al. |
| 11,934,318 | B2 | 3/2024 | Fan et al. |
| 11,947,483 | B2 | 4/2024 | Helps et al. |
| 11,972,292 | B1 | 4/2024 | Fan |
| 2001/0046212 | A1 | 11/2001 | Nakajima |
| 2002/0071450 | A1 | 6/2002 | Gasbarro et al. |
| 2002/0078271 | A1 | 6/2002 | Berry |
| 2002/0129272 | A1 | 9/2002 | Terrell et al. |
| 2002/0159385 | A1 | 10/2002 | Susnow et al. |
| 2002/0184452 | A1 | 12/2002 | Simmons et al. |
| 2002/0191599 | A1 | 12/2002 | Parthasarathy et al. |
| 2003/0058875 | A1 | 3/2003 | Arndt et al. |
| 2003/0154412 | A1 | 8/2003 | Hetzler et al. |
| 2004/0049603 | A1 | 3/2004 | Boyd et al. |
| 2005/0068798 | A1 | 3/2005 | Lee et al. |
| 2005/0080920 | A1 | 4/2005 | Bender et al. |
| 2005/0089033 | A1 | 4/2005 | Gupta et al. |
| 2005/0223118 | A1 | 10/2005 | Tucker et al. |
| 2006/0004941 | A1 | 1/2006 | Shah et al. |
| 2006/0056308 | A1 | 3/2006 | Gusat et al. |
| 2006/0056405 | A1 | 3/2006 | Chang et al. |
| 2006/0059242 | A1 | 3/2006 | Blackmore et al. |
| 2006/0090014 | A1 | 4/2006 | Wong et al. |
| 2006/0236063 | A1 | 10/2006 | Hausauer et al. |
| 2006/0242352 | A1 | 10/2006 | Torudbakken et al. |
| 2006/0251109 | A1 | 11/2006 | Muller et al. |
| 2006/0253619 | A1 | 11/2006 | Torudbakken et al. |
| 2006/0271713 | A1 | 11/2006 | Xie et al. |
| 2007/0038794 | A1 | 2/2007 | Purcell et al. |
| 2007/0104102 | A1 | 5/2007 | Opsasnick |
| 2007/0255802 | A1 | 11/2007 | Aloni et al. |
| 2007/0283123 | A1 | 12/2007 | Vick et al. |
| 2008/0031266 | A1 | 2/2008 | Tallet et al. |
| 2008/0043732 | A1 | 2/2008 | Desai et al. |
| 2008/0168194 | A1 | 7/2008 | Gregg et al. |
| 2009/0083392 | A1 | 3/2009 | Wong et al. |
| 2009/0113143 | A1 | 4/2009 | Domsch et al. |
| 2009/0172301 | A1 | 7/2009 | Ebersole et al. |
| 2010/0064070 | A1 | 3/2010 | Yoshimura et al. |
| 2010/0103837 | A1 | 4/2010 | Jungck et al. |
| 2010/0161870 | A1 | 6/2010 | Daniel |
| 2010/0232448 | A1 | 9/2010 | Sugumar et al. |
| 2010/0312850 | A1 | 12/2010 | Deshpande |
| 2011/0072204 | A1 | 3/2011 | Chang et al. |
| 2011/0072234 | A1 | 3/2011 | Chinya et al. |
| 2011/0268119 | A1 | 11/2011 | Pong et al. |
| 2011/0271010 | A1 | 11/2011 | Kenchammana et al. |
| 2012/0166690 | A1 | 6/2012 | Regula |
| 2013/0024591 | A1 | 1/2013 | Sun |
| 2013/0031328 | A1 | 1/2013 | Kelleher et al. |
| 2013/0132536 | A1 | 5/2013 | Zhang et al. |
| 2013/0318322 | A1 | 11/2013 | Shetty et al. |
| 2014/0237156 | A1 | 8/2014 | Regula et al. |
| 2015/0026286 | A1 | 1/2015 | Sharp et al. |
| 2015/0082000 | A1 | 3/2015 | Hong et al. |
| 2015/0089009 | A1 | 3/2015 | Tsirkin et al. |
| 2016/0070475 | A1 | 3/2016 | Zhang et al. |
| 2016/0085450 | A1 | 3/2016 | Ahn et al. |
| 2016/0094553 | A1 | 3/2016 | Azgin et al. |
| 2016/0162422 | A1 | 6/2016 | Weber |
| 2016/0269305 | A1 | 9/2016 | Sreeramoju et al. |
| 2017/0097909 | A1 | 4/2017 | Simionescu et al. |
| 2017/0132148 | A1 | 5/2017 | Liu et al. |
| 2017/0177520 | A1 | 6/2017 | Kampe et al. |
| 2017/0177528 | A1 | 6/2017 | Harriman et al. |
| 2017/0185528 | A1 | 6/2017 | Hansson et al. |
| 2017/0372088 | A1 | 12/2017 | Zhao et al. |
| 2018/0004703 | A1 | 1/2018 | Sharma et al. |
| 2018/0024938 | A1 | 1/2018 | Paltashev et al. |
| 2018/0046411 | A1 | 2/2018 | Coburn et al. |
| 2018/0052793 | A1 | 2/2018 | Fang |
| 2018/0176134 | A1* | 6/2018 | Pignataro ............ H04L 47/829 |
| 2018/0191623 | A1 | 7/2018 | Marty et al. |
| 2018/0198715 | A1 | 7/2018 | Shmilovici et al. |
| 2018/0205596 | A1* | 7/2018 | Chu .................. H04L 45/54 |
| 2018/0241629 | A1 | 8/2018 | Sato et al. |
| 2018/0359219 | A1 | 12/2018 | Israel et al. |
| 2019/0102310 | A1 | 4/2019 | Ramrakhyani et al. |
| 2019/0116121 | A1 | 4/2019 | Friedman et al. |
| 2019/0141041 | A1 | 5/2019 | Bhabbur et al. |
| 2019/0173810 | A1 | 6/2019 | Shpiner et al. |
| 2019/0188146 | A1 | 6/2019 | Dusanapudi et al. |
| 2019/0220425 | A1 | 7/2019 | Zemach et al. |
| 2019/0258415 | A1 | 8/2019 | Imamura |
| 2019/0294366 | A1 | 9/2019 | Kawamura et al. |
| 2019/0320019 | A1 | 10/2019 | Hamrick, Jr. |
| 2019/0324917 | A1 | 10/2019 | Cui et al. |
| 2019/0334828 | A1 | 10/2019 | Fairhurst et al. |
| 2019/0370173 | A1 | 12/2019 | Boyer et al. |
| 2019/0379767 | A1 | 12/2019 | Sharma et al. |
| 2020/0004685 | A1 | 1/2020 | Guim Bernat et al. |
| 2020/0119753 | A1 | 4/2020 | Chirca et al. |
| 2020/0159669 | A1 | 5/2020 | Duncan et al. |
| 2020/0177513 | A1 | 6/2020 | Zhang |
| 2020/0204489 | A1* | 6/2020 | Pianigiani ............ G06F 9/5072 |
| 2020/0236052 | A1 | 7/2020 | Srinivasan et al. |
| 2020/0264985 | A1 | 8/2020 | Lee |
| 2020/0280518 | A1 | 9/2020 | Lee et al. |
| 2020/0371955 | A1 | 11/2020 | Goodacre et al. |
| 2020/0387405 | A1 | 12/2020 | Xiao et al. |
| 2021/0019069 | A1 | 1/2021 | Sen et al. |
| 2021/0037107 | A1 | 2/2021 | Klenk et al. |
| 2021/0075633 | A1 | 3/2021 | Sen et al. |
| 2021/0083981 | A1 | 3/2021 | Shmilovici et al. |
| 2021/0132999 | A1 | 5/2021 | Haywood et al. |
| 2021/0232312 | A1 | 7/2021 | Prasad et al. |
| 2021/0234706 | A1 | 7/2021 | Nair et al. |
| 2021/0297350 | A1 | 9/2021 | Vegesna et al. |
| 2021/0318961 | A1 | 10/2021 | Peterson et al. |
| 2021/0345112 | A1 | 11/2021 | Elliott et al. |
| 2022/0004512 | A1 | 1/2022 | Cannata et al. |
| 2022/0060422 | A1 | 2/2022 | Sommers |
| 2022/0085916 | A1 | 3/2022 | Debbage et al. |
| 2022/0109587 | A1 | 4/2022 | Sapio et al. |
| 2022/0197787 | A1 | 6/2022 | Han et al. |
| 2022/0200906 | A1 | 6/2022 | Ye et al. |
| 2022/0214912 | A1 | 7/2022 | Julien et al. |
| 2022/0217085 | A1* | 7/2022 | Sankar ................ H04L 47/30 |
| 2022/0222118 | A1 | 7/2022 | Wang et al. |
| 2022/0248251 | A1 | 8/2022 | Ryu et al. |
| 2022/0283964 | A1 | 9/2022 | Burstein et al. |
| 2022/0291875 | A1 | 9/2022 | Diaz-Cuellar et al. |
| 2022/0394014 | A1 | 12/2022 | Wang et al. |
| 2023/0038094 | A1 | 2/2023 | Velasco |
| 2023/0044342 | A1 | 2/2023 | Wilkinson |
| 2023/0051781 | A1 | 2/2023 | Patel et al. |
| 2023/0093247 | A1 | 3/2023 | Kumar et al. |
| 2023/0096451 | A1 | 3/2023 | Johnson et al. |
| 2024/0028209 | A1 | 1/2024 | Berke et al. |
| 2024/0098023 | A1 | 3/2024 | Guo |
| 2024/0296138 | A1 | 9/2024 | Helps et al. |

(56) References Cited

U.S. PATENT DOCUMENTS

| | | |
|---|---|---|
| 2024/0311310 A1 | 9/2024 | Fan et al. |
| 2024/0414087 A1* | 12/2024 | Ranjan .................... H04L 47/26 |
| 2024/0422100 A1 | 12/2024 | Helps et al. |

FOREIGN PATENT DOCUMENTS

| | | |
|---|---|---|
| WO | WO-2005106693 A2 | 11/2005 |
| WO | WO-2009120798 A2 | 10/2009 |
| WO | WO-2020055921 A1 | 3/2020 |
| WO | WO-2022/005322 A1 | 1/2022 |
| WO | WO-2022108498 A1 | 5/2022 |
| WO | WO-2022198552 | 9/2022 |
| WO | WO-2024102915 A1 | 5/2024 |

OTHER PUBLICATIONS

International Search Report and Written Opinion for International Patent Application No. PCT/US2022/011491, dated Mar. 24, 2022 (8 pages).

International Search Report and Written Opinion for International Patent Application No. PCT/US2022/32841, dated Nov. 21, 2022 (10 pages).

International Search Report and Written Opinion for International Patent Application No. PCT/US2022/74833, dated Dec. 6, 2022 (8 pages).

International Search Report and Written Opinion for International Patent Application No. PCT/US2023/062168, dated May 12, 2023 (54 pages).

International Search Report and Written Opinion for International Patent Application No. PCT/US2023/61405, dated Jul. 11, 2023 (6 pages).

International Search Report and Written Opinion for International Patent Application No. PCT/US2023/082132, dated Jun. 6, 2024 (8 pages).

International Search Report and Written Opinion for International Patent Application No. PCT/US2024/029723, dated Aug. 22, 2024 (14 pages).

International Search Report and Written Opinion for International Patent Application No. PCT/US2023/029887, dated Oct. 26, 2023 (13 pages).

"Using Non-transparent Bridging in PCI Express Systems," by Jack Regula, 20040601, Jun. 1, 2004, pp. 4-30, XP002686987, U RL:http :/ /www.plxtech.com/files/pdf/technical/expresslane/ NontransparentBridging .pdf.

Sanker, Rochan, Foundational Fabrics for AI: Introducing the Accelerated Compute Fabric Switch, AI Hardware Summit, Sep. 13, 2023.

International Search Report and Written Opinion for International Patent Application No. PCT/US2024/039765, dated Oct. 22, 2024 (15 pages).

International Search Report and Written Opinion for International Patent Application No. PCT/US2024/052073, dated Apr. 28, 2025 (15 pages).

U.S. Appl. No. 17/570,261, filed Jan. 6, 2022, Server Fabric Adapter for I/O Scaling Of Heterogeneous And Accelerated Compute Systems, Rochan Sankar, et al.

U.S. Appl. No. 18/747,118, filed Jun. 18, 2024, Optimally Balanced Network Systems, Rochan Sankar, et al.

U.S. Appl. No. 18/778,611, filed Jul. 19, 2024, Server Fabric Adapter for I/O Scaling of Heterogeneous and Accelerated Compute Systems, Rochan Sankar, et al.

U.S. Appl. No. 19/037,768, filed Jan. 27, 2025, Server Fabric Adapter for I/O Scaling of Heterogeneous and Accelerated Compute Systems, Rochan Sankar, et al.

U.S. Appl. No. 17/836,532, filed Jun. 9, 2022, Transparent Remote Memory Access Over Network Protocol, Thomas Norrie, et al..

U.S. Appl. No. 18/755,372, filed Jun. 26, 224, Transparent Remote Memory Access Over Network Protocol, Thomas Norrie, et al.

U.S. Appl. No. 17/886,026, filed Aug. 11, 2022, System And Method For Congestion Control Using A Flow Level Transmit Mechanism, Shrijeet Mukherjee et al.

U.S. Appl. No. 18/102,033, filed Jan. 26, 2023, System And Method For One-Sided Read Rma Using Linked Queues, Shrijeet Mukerjee, et al.

U.S. Appl. No. 18/107,324, filed Feb. 8, 2023, System And Method For Using Dynamic Thresholds With Route Isolation For Heterogeneous Traffic In Shared Memory Packet Buffers, Ari Aravinthan, et al.

U.S. Appl. No. 18/447,180, filed Aug. 9, 2023, System And Method For Ghost Bridging, Thomas Norrie, et al.

U.S. Appl. No. 18/666,548, filed May 16, 2024, System And Method For An Optimized Staging Buffer For Broadcast/Multicast Operations, Shrijeet Mukherjee, et al.

U.S. Appl. No. 18/526,727, filed Dec. 1, 2023, A Modular Datacenter Interconnection System, David Skirmont, et al.

U.S. Appl. No. 18/785,542, filed Jul. 26, 2024, Method And System For Tracking And Moving Pages Within A Memory Hierarchy, Shrijeet Mukhrjee, et al.

U.S. Appl. No. 19/034,371, filed Jan. 22, 2025, Input/Output System Interconnect Redundancy and Failover, Frederic Vecoven, et al.

U.S. Appl. No. 17/836,532, filed Jun. 9, 2022, Transparent Remote Memory Access Over Network Protocol, Norrie, et al.

U.S. Appl. No. 18/755,372, filed Jun. 26, 2024, Transparent Remote Memory Access Over Network Protocol, Thomas Norrie, et al.

U.S. Appl. No. 19/172,409, filed Apr. 7, 2025, Transparent Remote Memory Access Over Network Protocol, Thomas Norrie, et al.

U.S. Appl. No. 19/046,232, filed Feb. 5, 2025, System and Method for Ghost Bridging, Thomas Norrie, et al.

International Search Report and Written Opinion for International Patent Application No. PCT/US2025/012514, dated Jul. 30, 2025 (11 pages).

* cited by examiner

SYSTEM AND METHOD FOR OPTIMALLY BALANCED NETWORK MULTIPATHING

TECHNICAL FIELD

This disclosure relates to a system and method for optimally balanced network multipathing that can improve communication speeds within a processing system having several processors and/or the speed of communication between such a system and a network.

BACKGROUND

Modern local area networks (LANs), particularly those deployed in cloud and machine learning environments, are implemented using network topologies and architectures that allow for rich connectivity, such as Clos or Fat-Tree. By their very nature, these types of networks allow for more than one network path from a given source to any destination. Beyond the benefits of network resiliency and route failover in the presence of link failures, the multiple paths can and have been used to increase the bandwidth between two communicating compute nodes. The Equal Cost Multi-Pathing (ECMP) protocol has become the most popular and effective method to accomplish this goal.

SUMMARY

In an aspect, the subject matter of this disclosure relates to a system for optimally balanced network multipathing. The system may include a fabric adapter communicatively coupled to a plurality of network ports, a plurality of controlling hosts, and a plurality of application hosts. The fabric adapter may be configured to receive contents of one or more headers of a network packet from at least one controlling host of the plurality of controlling hosts. The fabric adapter may be configured to receive control information for the network packet from the at least one controlling host. The control information may describe at least one of a state of a network or a state of an application running on at least one application host from the plurality of application hosts. The fabric adapter may be configured to receive, from an application host of the plurality of application hosts, a payload of a network packet. The fabric adapter may be configured to select a network path in the network based on the contents of the one or more headers and the control information. The fabric adapter may be configured to forward the network packet to a network port of the plurality of network ports based on the selected network path. The network packet may include the one or more headers and the payload.

In another aspect, the subject matter of this disclosure relates to a method of achieving optimally balanced network multipathing. The method includes: providing a fabric adapter communicatively coupled to a plurality of network ports, a plurality of controlling hosts, and a plurality of application hosts; receiving, at the fabric adapter and from at least one controlling host of the plurality of controlling hosts, contents of one or more headers of a network packet; receiving, at the fabric adapter and from the at least one controlling host, control information for the network packet, the control information describing at least one of a state of a network or a state of an application running on at least one application host from the plurality of application hosts; receiving, at the fabric adapter and from an application host of the plurality of application hosts, a payload of a network packet; selecting, by the fabric adapter and based on the contents of the one or more headers and the control information, a network path in the network; and forwarding, by the fabric adapter and based on the selected network path, the network packet to a network port of the plurality of network ports, the network packet including the one or more headers and the payload.

The above and other preferred features, including various novel details of implementation and combination of elements, will now be more particularly described with reference to the accompanying drawings and pointed out in the claims. It will be understood that the particular methods and apparatuses are shown by way of illustration only and not as limitations. As will be understood by those skilled in the art, the principles and features explained herein may be employed in various and numerous embodiments.

BRIEF DESCRIPTION OF THE DRAWINGS

The disclosed embodiments have advantages and features which will be more readily apparent from the detailed description, the appended claims, and the accompanying figures (or drawings). A brief introduction of the figures is below.

DETAILED DESCRIPTION

The Figures (Figs.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

In various examples, a "controlling host" can be or include a compute server, a compute node, or other computing device capable of controlling and/or coordinating one or more operations of a plurality of application hosts. One or more controlling hosts may control or influence network communication within a network, as described herein. For example, a fabric adapter can receive information from a controlling host and can use the information to select network paths and/or network ports for sending packets over the network and balancing network loads. In some embodiments, in a networked environment having a variety of application hosts, the controlling hosts may process packet headers according to one or more network protocols used in the network.

In various examples, an "application processor" (alternatively referred to as "application host") can be or include a compute server, a compute node, or other computing device capable of running one or more applications. For instance, an application processor can run a machine learning application, an artificial intelligence application, an email application, a web browser application, a word processing application, a spreadsheet application, other type of application, or any combination thereof. In some embodiments, in a networked environment having a variety of application hosts, the application processors may operate on one or more packet payloads.

In various examples, a "network port" can be a physical point where a network connection starts or ends. A network port can be used to connect wired or wireless network hardware. For instance, a network port can be an Ethernet port.

In various examples, a "network path" or "network route" can be or include a channel or path in a network (e.g., local area network) for transmitting data. A network path can include a sequence of network nodes through which data can pass from a source to a destination.

In various examples, the underlying principles of Equal Cost Multi-Pathing (ECMP) and its implementation are as follows. Routing tables in network switches are allowed to have multiple entries for packets that have been sent to a given destination by one or more sources. The selection of an entry in the routing table for a given packet among the available alternatives for a destination, and thus its network path to it, can employ various strategies. An overriding restriction, however, is that at no time should packet mis-ordering be introduced where packet ordering matters from the application's point of view. More often than not, today's state of the art implementations use some form of hashing of some of the packet's protocol headers' fields to meet these requirements, to keep the routing tables' sizes reasonable.

One shortcoming of existing ECMP implementations is their difficulty in achieving optimal load balancing of network traffic targeted to a given destination across multiple paths, which may result in some of the paths being overloaded while some of the others are underused. This usually occurs as a result of one or more of the following limitations. One possible limitation is hash collisions. Just like any hash algorithm, that maps a very large number of objects to a much smaller subset, the ECMP hash can (and quite often does) map unrelated packet flows to the same path without regard to what may be happening on the other paths. Another possible limitation is reliance on statistical multiplexing. In order to meet the strict packet ordering requirements, the hashing is performed over packet header fields that guarantee distinct network flows (e.g., L3/4, network and transport layer headers). When the number of flows hashed is large, hash algorithms are usually quite effective in uniformly spreading network flows across multiple paths. This is not the case, however, when the number of flows is relatively small, and hash collisions become a real problem. Another possible limitation is that not all flows are equal. Although ECMP load balancing algorithms identify and operate on network flows, network performance is evaluated (and applications rely on) network throughput, measured in Millions of packets per second (Mpps) and Gigabits per second (Gbps). Thus, it is quite common for some applications to have very few flows that move a large number of packets, while many other flows move a small number of packets only sporadically. This can result in a massive imbalance across ECMP paths. Another possible limitation is incomplete information. Typically, all ECMP load balancing and forwarding decisions are made in network switches locally and autonomously at an edge of the network (e.g., at the top of the rack switch, or TOR), on a packet-by-packet basis, without regard to the state of the rest of the network. These switches do not, therefore, take into account the utilization of downstream links that may be affected by other flows in real time, nor do they factor in congestion at the downstream switches in its decisions.

Perhaps a less obvious shortcoming in the current state of the art relates to its use of ECMP for network resiliency in the presence of link failures. Recovering from a failed link that belongs to an ECMP group and choosing a different network path may be quite cumbersome and may require remapping all the flows that were sent through the failed link to other links. A failed link in an ECMP group may break an optimal load balance that existed prior to link failure, at least temporarily. A failed link in an ECMP group may require remapping other flows (e.g., unrelated to the failed link) to re-acquire an optimal load balance. A failed link in an ECMP route may introduce temporary packet mis-ordering until a new flow mapping takes effect, including for flows that had not otherwise been affected by the failed link. In severe cases, a failed link in an ECMP route may cause route flapping.

Advantageously, aspects of the present disclosure provide technical solutions to the above-described problems. For instance, aspects of the present disclosure may allow for load balancing decisions that are more intelligent than blind hashing on packet header fields. The present system may allow for routing decisions based on both application and network states. Corrective load balancing actions may be taken almost instantaneously by controlling hosts using systems and methods described herein. In embodiments of the present system, alternate failure routes may be indicated via scatter gather list element (SGLE) buffers for every packet that may be sent to a failed link. Alternate failure route indications may allow for an override of a computed route for one or more network packets instantaneously with minimal disruptions or packet loss.

Figure 1:
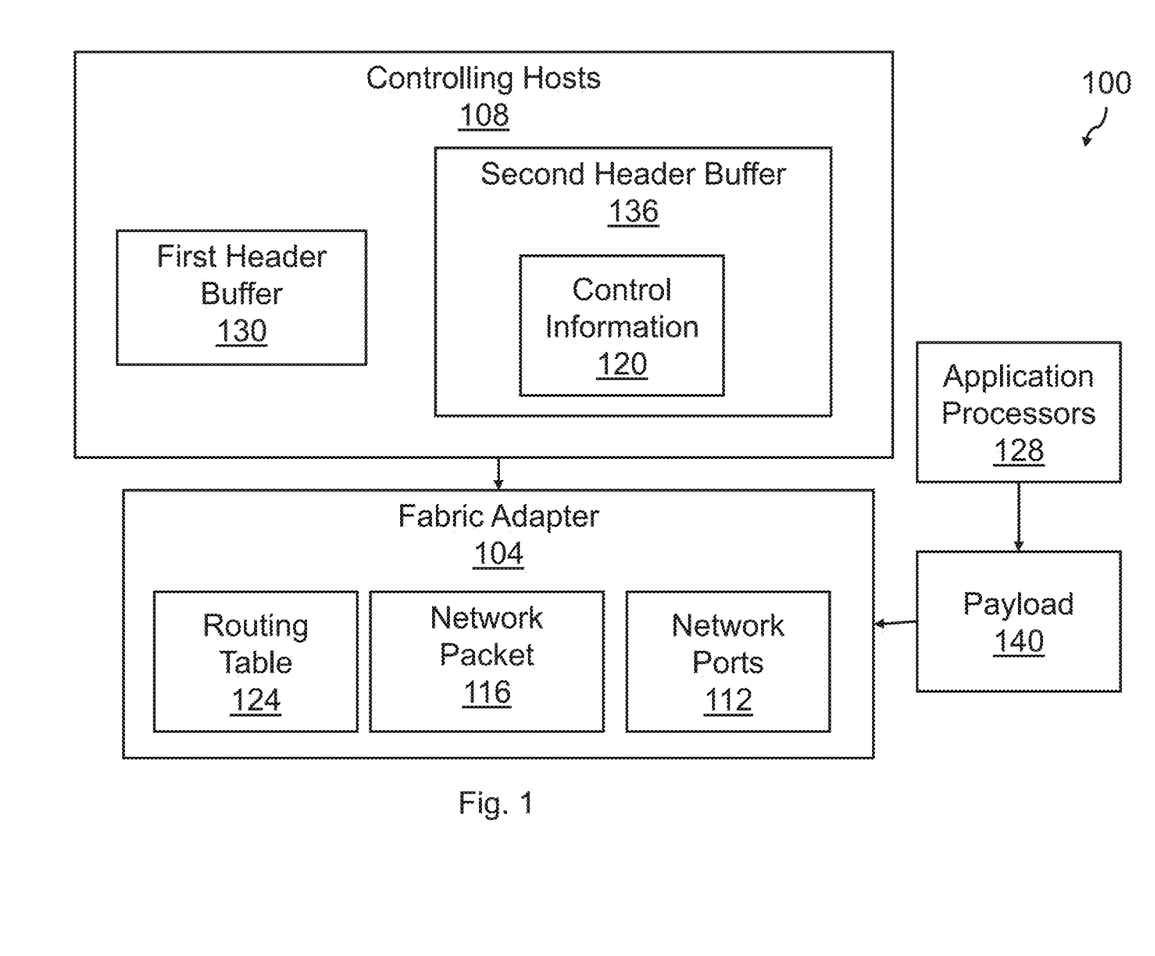
FIG. 1 illustrates a block diagram of a system for optimally balanced network multipathing, in accordance with certain examples.

Referring now to FIG. 1, a block diagram of a system 100 for optimally balanced network multipathing is presented, in accordance with certain examples. System 100 may include a plurality of controlling hosts 108, a plurality of network ports 112, a plurality of application processors 128, and a fabric adapter 104. Fabric adapter 104 may be a server fabric adapter (SFA) and/or may be included in an SFA system, as described herein. Fabric adapter 104 and controlling hosts 108 may be as described below with reference to FIG. 5. In some embodiments, controlling hosts 108 may be configured to provide one or more headers to fabric adapter 104. Headers may be included in one or more network packets 116. A payload for a network packet 116 may be retrieved or read by fabric adapter 104 from one or more application processors 128 or associated memory buffers. For example, packet headers may be read by fabric adapter 104 from one or more buffers associated with controlling hosts 108. Additionally or alternatively, packet payloads may be read by fabric adapter 104 from one or more buffers associated with application processors 128. A payload and one or more headers may be combined to form a network packet 116.

Fabric adapter 104 may be configured to forward or otherwise route one or more network packets 116 to one or more network ports 112 associated with one or more network paths within a network. In some embodiments, fabric adapter 104 may utilize a routing table 124 to select an appropriate network port 112 and/or network path for a network packet 116, as described herein. In some embodiments, system 100 or components thereof (e.g., fabric adapter 104 and/or network ports 112) may be part of a local area network (LAN), a cloud computing system, or other network architecture, without limitation.

In some embodiments, the fabric adapter 104 may obtain information related to network packets 116 from one or more controlling hosts 108. For example, a controlling host 108 may include a first header buffer 130 and a second header buffer 136, and fabric adapter 104 may receive or retrieve a header or header information from first header buffer 130 and/or second header buffer 136. The header or header information can include, for example, contents or information from a packet header, such as network addresses and/or destinations. Additionally or alternatively, the header information can include control information 120, which can be retrieved from the second header buffer 136. The fabric adapter 104 can retrieve information from first and second header buffers 130 and 136 either separately or simultaneously.

In certain examples, the fabric adapter 104 can use control information 120 to select a network path and/or a network port 112 for a network packet 116, as described herein. Control information 120 may be generated by a controlling host 108 based on application data (e.g., received from an application processor 128), network data (e.g., traffic data), and/or other data. The control information 120 can describe a state of a network (e.g., for sending the network packet 116) and/or a state of an application (e.g., running on application processors 128). In some examples, the state of the network can be defined by traffic data that describes, for example, anticipated and/or existing network traffic congestion, anticipated and/or existing network loads, network choke points, and/or other network condition. The state of the application can be defined by data that describes, for example, application traffic, application traffic patterns, app-level flows, or other application condition. Traffic data may be obtained by one or more controlling hosts 108, for example, based on application data (e.g., describing an application state or condition) or other information received from an application processor 128. Control information 120 may affect forwarding of one or more network packets 116.

Control information 120 may differ from information that may be retrieved from first header buffer 130. For instance, and without limitation, first header buffer 130 may include addresses, destinations, and/or other routing information related to network packet 116. At least a portion of the control information 120 may be generated using data from the application processors 128 and/or information provided by network management protocols that may run on the controlling hosts 108.

One or more controlling hosts 108 may generate control information 120 based on network data of system 100, such as, but not limited to, network traffic, network bandwidth, utilization of network ports 112, and/or other data. Controlling hosts 108 may utilize information from one or more network protocol stacks to determine traffic data. For instance, one or more controlling hosts 108 may perform operations for one or more network protocol stacks. A "network protocol stack" as used herein can refer to a collection of software protocols that provides communications between computers on a network and/or between computers and network infrastructure. One or more controlling hosts 108 may generate traffic data based on information obtained and/or interpreted by operation of the one or more network protocol stacks.

In various examples, traffic data used to generate control information 120 may include data of an amount, quantity, or transfer rate of network packets being sent over a network. For instance, traffic patterns may be extrapolated from application and/or network protocol stack processing elements. Traffic patterns may include anticipated future network transfers, future network transfer boundaries, future network transfer durations, future network transfer longevity, and/or other data of interest to a load balancer (e.g., including a hash function for selecting a network path). One or more controlling hosts 108 and/or fabric adapter 104 may have visibility into traffic data such as, but not limited to, application-level messages of various sizes, bursts of packets (referred to as "flowlets") from a same or different network flow, and/or packet transmissions of various distributions in time and/or size. In some examples, traffic data can be provided to controlling hosts 108 from the application processors 128.

In some embodiments, control information 120 may include or relate to network state awareness or a current status of a network associated with system 100. One or more controlling hosts 108 may have a full view of a network, including potential choke points on data links via one or more network protocol stacks that may reside in or be operated by one or more controlling hosts 108. Controlling hosts 108 can view real-time congestion occurrence indications in one or more network switches and can generate control information 120 based on such network congestion data. Network control traffic may include acknowledge (ACK) and/or congestion notification packets (CNP), which may be viewed as progress indicators of individual flow transfers. One or more controlling hosts 108 may be able to determine a state of a network with traffic flow granularity rather than viewing all traffic as an aggregate. The control information 120 can describe or relate to traffic data, congestion, network awareness, and/or other information for a network.

Advantageously, based on the control information 120, fabric adapter 104 can steer network packets 116 to network paths and/or network ports 120 that avoid congestion and/or improve overall network flow. For example, fabric adapter 104 may be able to prevent traffic congestion using the control information 120 and/or other insights provided by the controlling hosts 108. Fabric adapter 104 may optimize a flow of one or more network packets 116 via selection of network ports 112 associated with preferred network paths. The optimized flow may balance a load among available network paths and/or network ports 112 (e.g., according to an enhanced ECMP load balancing algorithm). Use of control information 120 by fabric adapter 104 may allow system 100 to avoid relying on statistical multiplexing or making speculative assumptions about network activity, when distributing one or more network packets 116.

In various examples, fabric adapter 104 may use the control information 120 and a routing table 124 to select network paths and/or network ports 112 when forwarding network packets 116. Control information 120 may produce an index into routing table 124. For example, to retrieve a network path or other information from the routing table 124, an index (e.g., a row number) can be generated by a hash function that identifies where the forwarding information is located in the routing table 124.

In some implementations, fabric adapter 104 may be configured to modify one or more indices of routing table 124 based on control information 120. For example, fabric adapter 104 may modify one or more indices of routing table 124 to rebalance loads among available network paths, according to traffic data, network congestion, or other information included in control information 120. A load balancer of fabric adapter 104 may determine a network path for network packet 116 based on the modified index. Selections of network paths and/or associated network ports 112 may be accomplished by indexing in routing table 124.

In some embodiments, control information 120 may include or identify an alternate failover route. The alternate failover route may be a network path that can be utilized in a case of a failed link in the network and/or a failed network port 112. A failed link can be or include, for example, a failed physical connection between two or more computing or network devices. For instance, a failed link may be caused by a failed data cable, a disconnected data cable, and/or a failed optical transceiver. The alternate failover route may be determined by one or more controlling hosts 108 based on network data, such as network telemetry data. In some examples, the alternate failover route can be used to rebalance loads when a network port of network ports 112 has failed or is no longer available or reliable. The alternate failover route may be provided by one or more controlling hosts 108 as a direct index into the routing table 124. The fabric adapter 104 can use routing table 124 to select the alternate failover route in response to a failed link and/or a failed network port 112. The alternate failover route may be utilized for any desired length of time, for example, for as long as the failed link persists. Additional alternate failover routes may be calculated by one or more controlling hosts 108, without limitation.

In some embodiments, system 100 may include or utilize one or more scatter gather lists (SGLs), which may store one or more memory buffer descriptors. SGLs may include one or more elements (SGLEs), and each SGLE may correspond to information of a memory buffer. For instance, an SGLE may include information about a size of a memory buffer and a location in a global memory space, such as second header buffer 136. One or more controlling hosts 108 may provide an SGLE that points to second header buffer 136. This can enable fabric adapter 104 to directly receive or retrieve control information 120 from a buffer of a controlling host 108.

Additionally or alternatively, one or more controlling hosts 108 may include in an SGLE buffer an index of one or more alternate failover routes in routing table 124 for network packets 116 that may be used to bypass a failed link. An index of one or more alternate failover routes may be used by fabric adapter 104 to override an index of a routing table (e.g., instantaneously), which may allow one or more network packets 116 to be forwarded to alternate network paths. In some embodiments, one or more controlling hosts 108 may insert updates to a routing table to ensure that an optimal balance (e.g., based on load or usage) may be restored or achieved for one or more network ports 112 that may be active. In some embodiments, a subsequent alternate failover route may be computed and entered into a routing table for each active network port 112. One or more controlling hosts 108 may be configured to reprogram one or more routing tables which may allow a rebalancing of network traffic distribution of system 100, such as in the presence of soft link errors or failures on links that may not be directly connected to system 100. One or more controlling hosts 108 may be configured to utilize telemetry data and/or probes and simulate a link failure condition. Based on the simulation results of a link failure condition, one or more controlling hosts 108 may prepare alternate routes a priori.

Still referring to FIG. 1, fabric adapter 104 may be in communication with a plurality of application processors 128. Application processors 128 may be configured to communicate one or more payloads 140 of one or more network packets 116 to fabric adapter 104. Payloads 140 may include data of one or more network packets 116. Data of one or more network packets 116 may include any data, without limitation. Application processors 128 may run one or more applications (e.g., machine learning applications) and may use or generate data that may become payloads 120. Application processors 120 may be configured to generate application data statistics in some embodiments. Application data statistics (e.g., data describing a state of an application running on application processors 128) may include, for example, an amount of data sent over a network by the application, types of data being sent or that will be sent over a network, types of applications, and/or other relevant application statistics. These statistics may be communicated to fabric adapter 104 and/or controlling hosts 108 from one or more application processors 128. Control information 120 may be derived based on network traffic and/or application data statistics. In some embodiments, control information 120 may be continuously updated (e.g., by controlling hosts 108) based on application and/or network state data. Fabric adapter 104 may be configured to combine one or more headers (e.g., retrieved from first and/or second header buffers 130 and 136) with payloads 140 to form network packets 116. In some embodiments, fabric adapter 104 may combine a header from first header buffer 130 with payload 140 to form a network packet 116.

In various examples, flows of network activity, such as a transfer of one or more network packets 116, may be steered to links in an Equal-Cost Multi-Path (ECMP) group of system 100. For instance, flows of network activity may be steered to one or more network ports 112 of an ECMP group based on a utilization of the one or more network ports 112, such as by steering traffic to less utilized network ports 112 (e.g., compared to other network ports 112). An ECMP group may allow for balancing traffic of network packets 116 across multiple ports 112 and/or network paths and may avoid congestion of a single network port 112 or network path. An ECMP group may provide for redundancy by having multiple equal-cost paths, such that if one paths fails, traffic may continue on one or more other paths without interruption.

In some embodiments, applications that may be in communication with system 100 may use multiple application-level (ULP) flows that may be sent over a same network-level flow or over multiple network flows. Network packets 116 belonging to different applications may not require strict ordering, even when sent over a same network-level flow. A load balancer of the fabric adapter 104, which may be aware of application-level ordering, may be configured to balance one or more network packets 116 over multiple network paths based on application data ordering, which may allow for a higher granularity compared to balancing one or more network packets 116 on a network-level ordering. For instance, application data blocks that are independent of each other, but are using the same network connection, may not have to be sent in order. A load balancer of fabric adapter 104 may be configured to order application data blocks independently of one another, despite the application data blocks utilizing a same network connection. A load balancer of fabric adapter 104 may utilize any data described herein to select an ordering of application data blocks.

Still referring to FIG. 1, fabric adapter 104 may be configured to hash control information 120 and/or certain header fields of one or more network packets 116. Fabric adapter 104 may be configured to compute an ECMP hash on one or more network header fields. A network of system 100 may include an entropy field, which may be a bit pattern included in a hash for ECMP route selection. Entropy fields may be analyzed by fabric adapter 104. For instance, fabric adapter 104 may compare an entropy field to optimal entropy criteria. In an event an entropy field of a network is determined to be sub-optimal, fabric adapter 104 may be configured to modify a bit pattern of the entropy field which may allow fabric adapter 104 to select a different network path without changing header fields.

Fabric adapter 104 may factor network, application, and/or anticipated traffic pattern awareness into forwarding decisions for one or more network packets 116. In some embodiments, one or more weights of one or more network paths may be calculated and utilized in deciding a network path for one or more network packets 116. Weights may be numbers on a scale from 0 to 1, 0 to 100, and/or other numerical representations of an attribute or attributes of value. In some embodiments, two or more weights may be calculated for each potential network path of one or more network packets 116. Weights may include or be determined based on, for example, network path utilization, packet size, network bandwidth, origin of one or more network packets 116, and/or other factors. The weights may provide an indication of how desirable one path is relative to one or more other paths, for example, with respect to latency, reliability, failure rate, or other path performance characteristic.

In some embodiments, fabric adapter 104 may utilize an ECMP strategy to forward one or more network packets 116. Fabric adapter 104 may utilize the routing table 124, which may include information for one or more network packets 116 to be sent to one or more network ports 112 or other destinations. The routing table 124 may include information such as, but not limited to, next hop address (e.g., L2/L3 hop addresses), port of departure, and/or other information.

Figure 2:
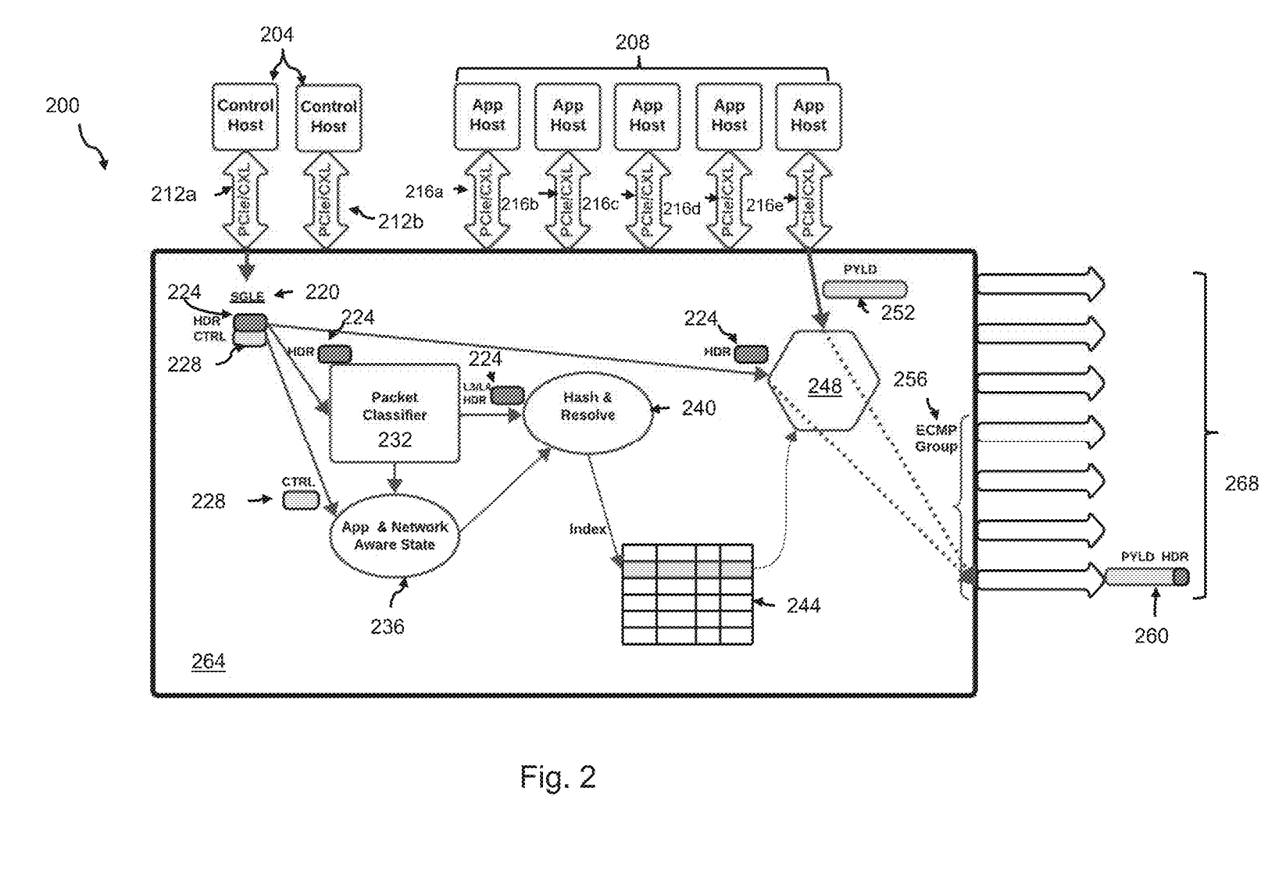
FIG. 2 illustrates a flow diagram of a system for optimally balanced network multipathing, in accordance with certain examples.

Referring now to FIG. 2, a flow diagram of an optimally balanced network multipathing system 200 is shown. System 200 may include one or more controlling hosts 204. Controlling hosts 204 may be in communication with fabric adapter 264 of system 200. Fabric adapter 264 may be as described above with reference to FIG. 1 (e.g., fabric adapter 264 may be identical to fabric adapter 104). In some embodiments, one or more controlling hosts 204 may be in communication with fabric adapter 264 via one or more PCIe/CXL connections 212a-b. In some embodiments, system 200 may include one or more application processors 208 (also referred to as "application hosts" or "app hosts"). App hosts 208 may include one or more computing devices that transmit payloads to a network. App host 208 may include one or more computing devices running on a cloud or LAN network. In some embodiments, app hosts 208 may transmit one or more payloads to fabric adapter 264. The app hosts 208 may be connected to fabric adapter 264 via PCIe/CXL interfaces 216a-e. Controlling hosts 204 and app hosts 208 may be as described above with reference to FIG. 1 (e.g., controlling hosts 204 and app hosts 208 may be identical to controlling hosts 108 and application processors 128, respectively).

Header 224 may be generated by one or more controlling hosts 204 and may be stored in a first header buffer (e.g., the header buffer 130). Control information 228 (e.g., the control information 120) may be generated by one or more controlling hosts 204 and may be stored in a second buffer, separate from the first buffer for header 224. The second buffer containing control information 228 may be pointed to by one or more SGL elements (SGLEs) 220. SGLEs 220 may be elements of data in an SGL structure. In some embodiments, SGLEs 220 may include information of memory buffer descriptors and/or locations of elements of an SGL in a global memory space, such as addresses. An SGLE 220 may provide a pointer for the second buffer containing the control information 228. Fabric adapter 264 may read the first buffer for header 224 first, and may read the second buffer of control information 228 second (after acquiring the pointer). An SGLE 220 may include an address and a size. Header 224 and control information 228 may be as described above with reference to FIG. 1.

Header 224 may be sent to packet classifier 232. Packet classifier 232 may be configured to receive headers 224 of one or more network packets and classify headers 224 into two or more groups, based on various criteria. Such criteria may include, but is not limited to, source and/or destination IP addresses, source and/or destination port numbers, protocol types (e.g., TCP, UDP, ICMP), differentiated services code point (DCSP) values, VLAN tags, application layer information, and/or other criteria. Packet classifier 232 may utilize one or more methods of classification. For instance and without limitation, packet classifier 232 may utilize an exact match, prefix match, range match, and/or ternary content addressable memory. Packet classifier 232 may provide hash function 240 with one or more subsets of one or more packet header fields. In some embodiments, packet classifier 232 may provide network awareness state function 236 with instructions for how to interpret control information 228.

Header 224 and/or control information 228 may be sent to a hash function 240. Hash function 240 may include any hashing algorithm, without limitation. For instance, hash function 240 may include, but is not limited to, CRC32, MD5, SHA-1, SHA-256, and/or other hashing algorithms. Hash function 240 may produce a unique index to a routing table (e.g., the routing table 124) used to manage network packet flow, as described herein. In some embodiments, hash function 240 may include a resolve function. A resolve function may consider control information 228 when determining an index for the routing table. In some examples, the hash function 240 and the resolve function may be collectively referred to herein as a load balancer.

In some embodiments, control information 228 may be sent to an application and network awareness state function 236, which may use the control information 228 and/or other information to select network paths and/or associated network ports 268 that balance loads (e.g., across a plurality of network paths) and/or improve network efficiency. Fabric adapter 264 may utilize data of application and/or network protocol stacks to perform application and network awareness state function 236. Application and network awareness state function 236 may be programmed to generate application and/or network insights into the network path and/or network port determination. Application and network awareness state function 236 may be programmed to track an amount of data being sent by one or more application processors.

In some examples, application and network awareness state function 236 may be programmed to identify network packets belonging to different application flows. Network packets belonging to different application flows may not require strict order, even when sent over a same network flow. Utilizing information of application flows, application and network awareness state function 236 may provide packet spreading over multiple network paths with increased granularity compared to existing systems.

In some embodiments, application and network awareness state function 236 may use the control information 228 or other information (e.g., from app hosts 208) to respond to current or anticipated traffic patterns. For instance, application and network awareness state function 236 may be programmed to respond to anticipated future network transfers, future network transfer boundaries, future network transfer durations, future network transfer longevities, and/or other information. Application and network awareness state function 236 may respond to traffic pattern data of application-level messages of various sizes, flowlets of packets from a same or different flow, and/or period packet transmissions of various distributions in time and/or size. Application and network awareness state function 236 may be programmed to respond to network awareness data, such as potential choke points on oversubscribed links and/or real time congestion occurrence indications in one or more network switches. In some embodiments, application and network state function 236 may be programmed to respond to network control traffic, such as ACK and CNP packets, which may be viewed as progress indicators for individual flow transfers, and serve as early warning signs when a flow becomes congested.

In some embodiments, output from the application and network awareness state function 236 may be fed to hash function 240. The output may include control information 228, traffic data, application data, and/or network data. For instance, and without limitation, application and network state awareness function 236 may supplement control information 228 with traffic data, application data, and/or network data. Hash function 240 may index a network route in routing table 244 and/or may provide indexes that can be used to retrieve network paths from routing table 244. Information fed to hash function 240 can include, for example, the output from the application and network awareness state function 236, portions of packet headers 224, and/or output from the packet classifier 232. The hash function 240 can provide an index (e.g., a row number or location) where network path information can be found in routing table 244. Routing table 244 may include information such as, but not limited to, a port of departure, one or more next hop addresses, and/or other network path information for one or more packets. In some embodiments, routing table 244 may be an ECMP routing table.

In various examples, one or more controlling hosts 204 may be configured to adjust packet flow distribution utilizing a background process (e.g., to generate control information 228), in response to traffic imbalance occurrence. In some embodiments, one or more controlling hosts 204 may pre-compute one or more network paths and/or routes as alternatives to traffic imbalances. A plurality of computed routes may be sorted based on a closeness to an optimal balanced system. The computed network paths or routes may be included in or described by the control information 228).

Fabric adapter 264 may include path selector 248, which may combine header 224 with payload 252 to form network packet 260 (e.g., by performing a mux function). Path selector 248 may steer network packet 260 to a network port of network ports 268, which may balance loads without relying on statistical multiplexing or speculative assumptions about network flow activity. Network flows may be steered to links of network ports 268 in ECMP group 256. For example, network flows may be steered to links that are less loaded than other links in ECMP group 256.

Fabric adapter 264 may continuously adjust network packet flow distributions or balance network loads based on information from the controlling hosts 204 (e.g., the control information 228) and/or other system components. One or more controlling hosts 204 may identify (e.g., in control information 228) one or more network routes and/or paths, as alternatives to a current route, based on a variety of criteria, such as, but not limited to, failed links, active links, network packet destination, network bandwidth, predicted network and/or application traffic, and/or other data. In some embodiments, each forwarding decision for one or more network packets may be based on network and/or application awareness, anticipated traffic pattern awareness, and/or other factors. One or more controlling hosts 204 may compute one or more weights of one or more network routes for a network packet. Such weights may include, but are not limited to, path utilization, path bandwidth, path destination, and/or other factors. The weights can be used to determine or can be included in the control information 228. Additionally or alternatively, fabric adapter 264 may modify an entropy associated with a forwarding decision for one or more network packets. Fabric adapter 264 may overload or adapt an entropy field of system 200, which may allow for increased functionality and size compared to existing systems.

Figure 3:
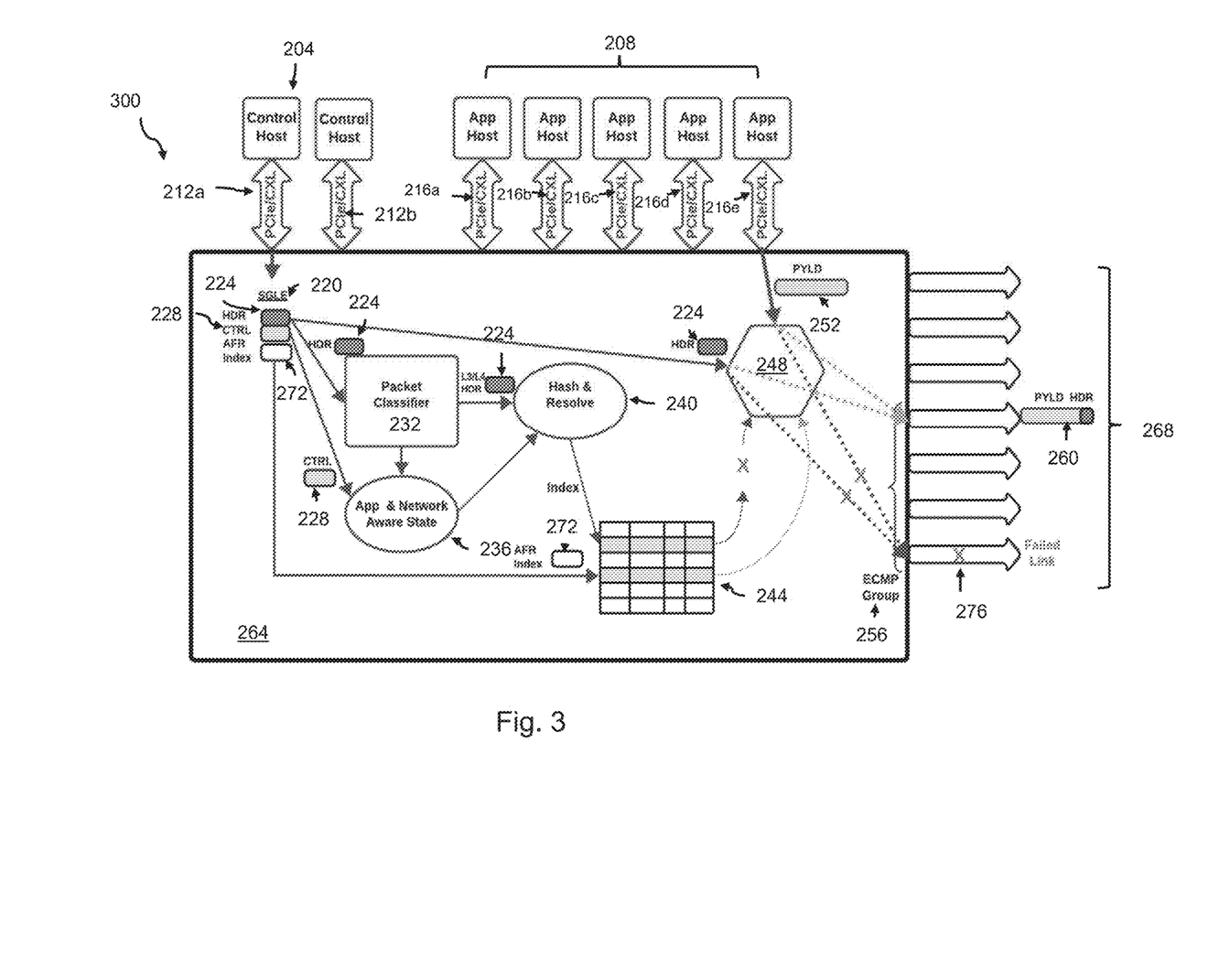
FIG. 3 illustrates a flow diagram of an embodiment of a system for optimally balanced network multipathing with alternate failover routing, in accordance with certain examples.

Referring now to FIG. 3, a flow diagram of a system 300 for alternate failure routing is presented. System 300 may include control hosts 204, app host 208, SGLE 220, packet classifier 232, application and network aware state 236, hash and resolve function 240, routing table 244, each of which may be as described above with reference to FIG. 2. In general, an alternate failure route is a network path that can be selected when a failed link occurs in a network path that could otherwise be selected by the fabric adapter. For example, when a network path (e.g., identified using the hash and resolve function 240 and the routing table 244) has a failed link, the fabric adapter can select the alternate failure route.

In some embodiments, the alternate failure route can be identified using an alternate failure route index 272, and the fabric adapter 264 may receive or retrieve the alternate failure route index 272 from one or more controlling hosts 204. One or more controlling hosts 204 may be configured to provide an alternate failure route index 272 as an SGLE 220 entry. The alternate failure route can be retrieved from the routing table 244 using the alternate failure route index 272. The alternate failure route may be a network path and/or route for a network packet that is used in an event of a link failure in a different network path and/or route. System 300 may operate as described above with reference to FIG. 2, with the addition of incorporation of alternate failure route index 272 into routing table 244.

Alternate failure route may be indexed into and retrieved from routing table 244. Based on alternate failure route index 272 of routing table 244, path selector 248 may select an alternate path for network packet 260. For instance, a link failure 276 may occur for a network path or a network port 268, in which case path selector 248 may select an alternative network port based on alternate failure route index 272. To change a network packet's route, an index for a given network packet flow in routing table 244 may need to be adjusted. One or more controlling hosts 204 may provide in SGLE 220 an alternate failure route index 272 for each given network packet of a plurality of network packets until such time that hash function 240 is adjusted to automatically index the new entry in the route table. In some embodiments, a next best alternate failure route may be calculated and indexed into routing table 244. Subsequent or additional alternate failure routes may be calculated as desired.

Figure 4:
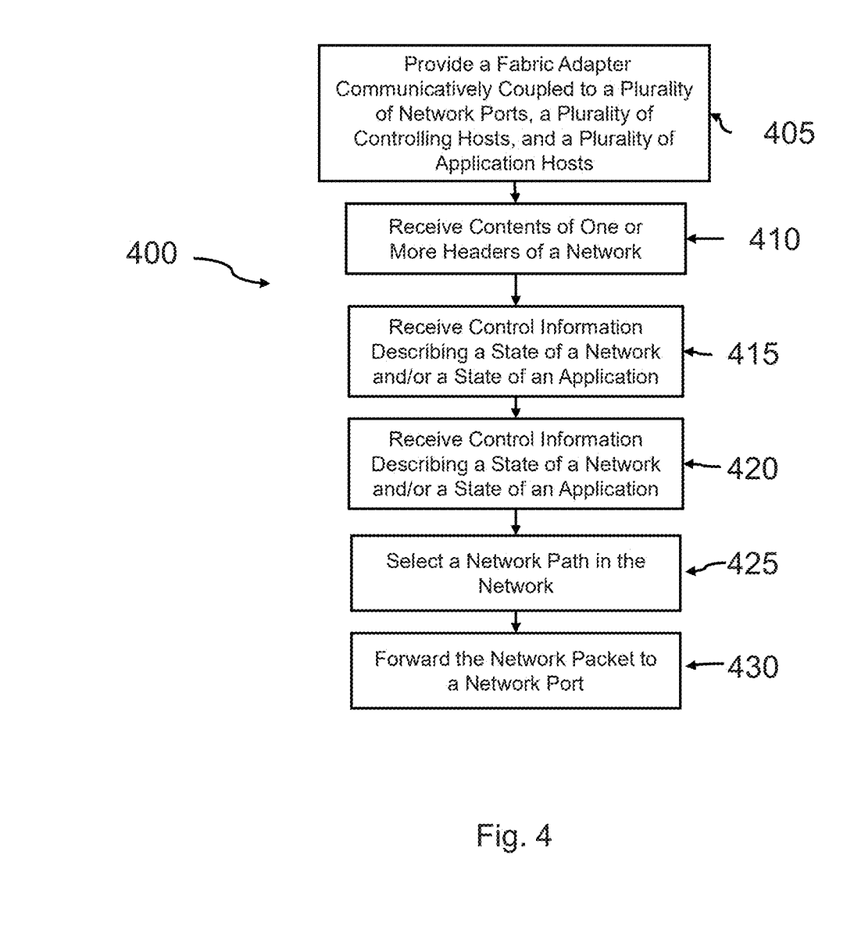
FIG. 4 illustrates a flowchart of a method of optimally balanced network multipathing, in accordance with certain examples.

Referring now to FIG. 4, a flowchart of a method 400 for optimally balancing a multipath network is presented. At step 405, method 400 includes providing a fabric adapter communicatively coupled to a plurality of network ports, a plurality of controlling hosts, and a plurality of application hosts. This step may be implemented without limitation as described above with reference to FIGS. 1-3.

At step 410, method 400 includes receiving contents of one or more headers of a network packet. Contents may include information of a network packet such as addresses, routing, and the like. In some embodiments, the contents may be received or retrieved by a fabric adapter (e.g., fabric adapter 264) from a first header buffer in a controlling host (e.g., controlling host 204). In some embodiments, the controlling host may send the contents to the fabric adapter. The first header buffer may include one or more headers of a network packet. In some embodiments, a controlling host may notify the fabric adapter that a network packet may be ready for transmission, and the fabric adapter may obtain contents of the network packet's header from a header buffer. This step may be implemented without limitation as described above with reference to FIGS. 1-3.

At step 415, method 400 includes receiving control information (e.g., control information 120 or 228) describing a state of a network and/or a state of an application. Control information may be retrieved from a second header buffer that may reside in a controlling host. Control information may be used by the fabric adapter to select network paths, as described herein. Control information may be calculated based on traffic data, application data (e.g., from an application processor), and/or other data. For instance, one or more controlling hosts may generate control information and store it in a second header buffer, and the fabric adapter may retrieve the control information from the second buffer. In some embodiments, the second header buffer may be pointed to by an SGLE in an SGL. In some embodiments one or more header fields of a first and/or second header buffer may be classified by a packet classifier (e.g., packet classifier 232). Information from the first head buffer and/or the second header buffer (e.g., control information) may be extracted and passed to a hash function. The hash function may determine and select a load balanced path and may generate an index for a routing table, which may be used by the fabric adapter to select a network path for the network packet. This step may be implemented without limitation as described above with reference to FIGS. 1-3.

At step 420, method 400 includes receiving a payload of a network packet. A payload of a network packet may be received by one or more application hosts. This step may be implemented without limitation as described above with reference to FIGS. 1-3.

At step 425, method 400 includes selecting a network path in the network. A network port for the network packet may be selected based on contents of one or more headers and/or control information. In some embodiments, a network path may be selected based at least in part on an index of a routing table. For instance, a load balanced path for a network packet may be indexed in a routing table, which the fabric adapter may utilize in selecting the network path for the network packet. The index can be generated using the hash function and can be used by the fabric adapter to identify and select the network path from the routing table. This step may be implemented without limitation as described above with reference to FIGS. 1-3.

At step 430, method 400 includes forwarding the network packet to a network port corresponding to the selected network path. In some embodiments, a payload may be received from one or more application processors and combined with a header for the network packet. A path selector may steer the network packet (including the header and the payload) to the network port corresponding to the selected network path. This step may be implemented without limitation as described above with reference to FIGS. 1-3.

In some embodiments, method 400 includes determining or calculating an alternate failover route for a network packet. The alternate failover route may be determined by one or more controlling hosts. The alternate failover route may be a network path and/or route that is used for a network packet in an event of a link failure for a different network path and/or route. In some embodiments, method 400 includes communicating an alternate failover route for a network packet (e.g., from a controlling host to the fabric adapter) as an SGLE in an SGL. An alternate failover route may be indexed into a routing table and may be selected in response to the link failure. One or more controlling hosts may provide an alternate failure route for network packets until such time that a hash function is adjusted to automatically index the alternate failure route in the routing table. In some embodiments, a next best alternate failure route may be calculated and indexed into a routing table.

Figure 5:
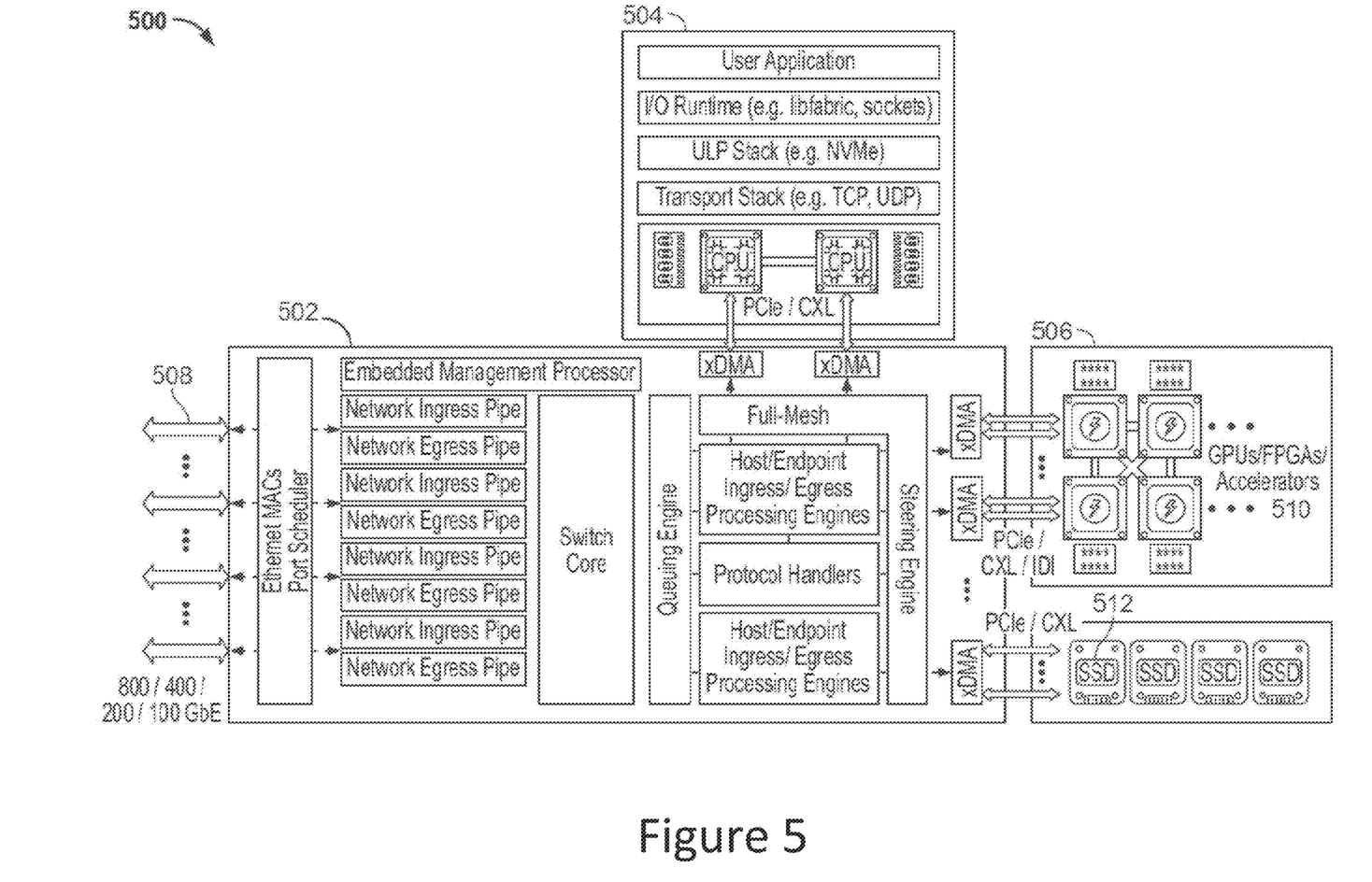
FIG. 5 illustrates a server fabric adapter that may be used in systems and methods described throughout this disclosure, in accordance with certain examples.

FIG. 5 illustrates an exemplary server fabric adapter architecture 500 for accelerated and/or heterogeneous computing systems in a data center network. The server fabric adapter (SFA) 502 of FIG. 5 may be used to implement the systems and methods described herein, for example, as shown in FIGS. 1-4. In some embodiments, SFA 502 may connect to one or more controlling hosts 504, one or more endpoints 506, and one or more Ethernet ports 508. An endpoint 506 may be a GPU, accelerator, FPGA, etc. Endpoint 506 may also be a storage or memory element 512 (e.g., SSD), etc. SFA 502 may communicate with the other portions of the data center network via the one or more Ethernet ports 508.

In some embodiments, the interfaces between SFA 502 and controlling host CPUs 504 and endpoints 506 are shown as over PCIe/CXL 514*a* or similar memory-mapped I/O interfaces. In addition to PCIe/CXL, SFA 502 may also communicate with a GPU/FPGA/accelerator 510 using wide and parallel inter-die interfaces (IDI) such as Just a Bunch of Wires (JBOW). The interfaces between SFA 502 and GPU/FPGA/accelerator 510 are therefore shown as over PCIe/CXL/IDI 514*b*.

SFA 502 is a scalable and disaggregated I/O hub, which may deliver multiple terabits-per-second of high-speed server I/O and network throughput across a composable and accelerated compute system. In some embodiments, SFA 502 may enable uniform, performant, and elastic scale-up and scale-out of heterogeneous resources. SFA 502 may also provide an open, high-performance, and standard-based interconnect (e.g., 800/400 GbE, PCIe Gen 5/6, CXL). SFA 502 may further allow I/O transport and upper layer processing under the full control of an externally controlled transport processor. In many scenarios, SFA 502 may use the native networking stack of a transport host and enable ganging/grouping of the transport processors (e.g., of x86 architecture).

As depicted in FIG. 5, SFA 502 connects to one or more controlling host CPUs 504, endpoints 506, and Ethernet ports 508. A controlling host CPU or controlling host 504 may provide transport and upper layer protocol processing, act as a user application "Master," and provide infrastructure layer services. An endpoint 506 (e.g., GPU/FPGA/accelerator 510, storage 512) may be producers and consumers of streaming data payloads that are contained in communication packets. An Ethernet port 508 is a switched, routed, and/or load balanced interface that connects SFA 502 to the next tier of network switching and/or routing nodes in the data center infrastructure In some embodiments, SFA 502 is responsible for transmitting data at high throughput and low predictable latency between:

Network and Host;
Network and Accelerator;
Accelerator and Host;
Accelerator and Accelerator; and/or
Network and Network.

In general, when transmitting data/packets between the entities, SFA 502 may separate/parse arbitrary portions of a network packet and map each portion of the packet to a separate device PCIe address space. In some embodiments, an arbitrary portion of the network packet may be a transport header, an upper layer protocol (ULP) header, or a payload. Transport headers or other headers may have header fields such as, but not limited to, one or more key-value pairs that may convey metadata or control information. For instance and without limitation, header fields may include, but are not limited to, "Content-Type", "User-Agent", "Accept", "Source IP Address", "Destination IP Address", "Sequence Number", "File Size", "File Type", "Creation Date", and/or other key-value pairs and/or data fields SFA 502 is able to transmit each portion of the network packet over an arbitrary number of disjoint physical interfaces toward separate memory subsystems or even separate compute (e.g., CPU/GPU) subsystems.

By identifying, separating, and transmitting arbitrary portions of a network packet to separate memory/compute subsystems, SFA 502 may promote the aggregate packet data movement capacity of a network interface into heterogeneous systems consisting of CPUs, GPUs/FPGAs/accelerators, and storage/memory. SFA 502 may also factor, in the various physical interfaces, capacity attributes (e.g., bandwidth) of each such heterogeneous systems/computing components.

In some embodiments, SFA 502 may interact with or act as a memory manager. SFA 502 provides virtual memory management for every device that connects to SFA 502. This allows SFA 502 to use processors and memories attached to it to create arbitrary data processing pipelines, load balanced data flows, and channel transactions towards multiple redundant computers or accelerators that connect to SFA 502. Moreover, the dynamic nature of the memory space associations performed by SFA 502 may allow for highly powerful failover system attributes for the processing elements that deal with the connectivity and protocol stacks of system 500.

Additional Considerations

In some implementations, at least a portion of the approaches described above may be realized by instructions that upon execution cause one or more processing devices to carry out the processes and functions described above. Such instructions may include, for example, interpreted instructions such as script instructions, or executable code, or other instructions stored in a non-transitory computer readable medium. The storage device may be implemented in a distributed way over a network, for example as a server farm or a set of widely distributed servers, or may be implemented in a single computing device.

Although an example processing system has been described, embodiments of the subject matter, functional operations and processes described in this specification can be implemented in other types of digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible nonvolatile program carrier for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "system" may encompass all kinds of apparatus, devices, and machines for processing data, including by way of example a programmable processor, a computer, or multiple processors or computers. A processing system may include special purpose logic circuitry, e.g., an FPGA (field programmable gate array) or an ASIC (application specific integrated circuit). A processing system may include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a standalone program or as a module, component, subroutine, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program can include, by way of example, general or special purpose microprocessors or both, or any other kind of central processing unit. Generally, a central processing unit will receive instructions and data from a read-only memory or a random access memory or both. A computer generally includes a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other steps or stages may be provided, or steps or stages may be eliminated, from the described processes. Accordingly, other implementations are within the scope of the following claims.

The phraseology and terminology used herein is for the purpose of description and should not be regarded as limiting.

The term "approximately", the phrase "approximately equal to", and other similar phrases, as used in the specification and the claims (e.g., "X has a value of approximately Y" or "X is approximately equal to Y"), should be understood to mean that one value (X) is within a predetermined range of another value (Y). The predetermined range may be plus or minus 20%, 10%, 5%, 3%, 1%, 0.1%, or less than 0.1%, unless otherwise indicated.

The indefinite articles "a" and "an," as used in the specification and in the claims, unless clearly indicated to the contrary, should be understood to mean "at least one." The phrase "and/or," as used in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of or "exactly one of," or, when used in the claims, "consisting of," will refer to the inclusion of exactly one element of a number or list of elements. In general, the term "or" as used shall only be interpreted as indicating exclusive alternatives (i.e. "one or the other but not both") when preceded by terms of exclusivity, such as "either," "one of," "only one of," or "exactly one of" "Consisting essentially of," when used in the claims, shall have its ordinary meaning as used in the field of patent law.

As used in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The use of "including," "comprising," "having," "containing," "involving," and variations thereof, is meant to encompass the items listed thereafter and additional items.

Use of ordinal terms such as "first," "second," "third," etc., in the claims to modify a claim element does not by itself connote any priority, precedence, or order of one claim element over another or the temporal order in which acts of a method are performed. Ordinal terms are used merely as labels to distinguish one claim element having a certain name from another element having a same name (but for use of the ordinal term), to distinguish the claim elements.

Having thus described several aspects of at least one embodiment of this invention, it is to be appreciated that various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A system for optimally balanced network multipathing, the system comprising:
    a fabric adapter communicatively coupled to a plurality of network ports, a plurality of controlling hosts, and a plurality of application hosts, the fabric adapter configured to utilize at least one processor to:
        retrieve, from a first buffer of at least one controlling host of the plurality of controlling hosts, contents of one or more headers of a network packet;
        retrieve, from a second buffer of the at least one controlling host, control information for the network packet, the control information describing at least one of anticipated traffic congestion for a network or anticipated loads for the network;
        receive, from an application host of the plurality of application hosts, a payload of a network packet;
        select, based on the contents of the one or more headers and the control information, a network path in the network; and
        forward, based on the selected network path, the network packet to a network port of the plurality of network ports, the network packet comprising the one or more headers and the payload.

2. The system of claim 1, wherein each controlling host from the plurality of controlling hosts and each application host from the plurality of application hosts comprises a compute node.

3. The system of claim 1, wherein the control information is retrieved using one or more scatter gather elements (SGLEs) in a scatter gather list (SGL).

4. The system of claim 1, wherein the control information describes the state of the network.

5. The system of claim 1, wherein the control information describes the state of the application running on the at least one application host from the plurality of application hosts.

6. The system of claim 1, wherein the fabric adapter is configured to select the network path to balance loads among a plurality of available paths in the network, based on the contents of the one or more headers and the control information.

7. The system of claim 1, wherein the fabric adapter is configured to select the network path using a routing table.

8. The system of claim 1, wherein the control information identifies an alternate network path route to be used in an event of a network path failure.

9. The system of claim 8, wherein the fabric adapter is configured to switch from the selected network path to the alternate network path route by selecting an entry in a routing table.

10. The system of claim 1, wherein the fabric adapter is further configured to modify an entropy field of the network packet to include the state of the network and the state of the application.

11. A method of achieving optimally balanced network multipathing, the method comprising:
    providing a fabric adapter communicatively coupled to a plurality of network ports, a plurality of controlling hosts, and a plurality of application hosts;
    retrieving, by the fabric adapter and from a first buffer of at least one controlling host of the plurality of controlling hosts, contents of one or more headers of a network packet;
    retrieving, by the fabric adapter and from a second buffer of the at least one controlling host, control information for the network packet, the control information describing at least one of anticipated traffic congestion for a network or anticipated loads for the network;

receiving, at the fabric adapter and from an application host of the plurality of application hosts, a payload of a network packet;

selecting, by the fabric adapter and based on the contents of the one or more headers and the control information, a network path in the network; and forwarding, by the fabric adapter and based on the selected network path, the network packet to a network port of the plurality of network ports, the network packet comprising the one or more headers and the payload.

12. The method of claim 11, wherein each controlling host from the plurality of controlling hosts and each application host from the plurality of application hosts comprises a compute node.

13. The method of claim 11, wherein retrieving the control information comprises using one or more scatter gather elements (SGLEs) in a scatter gather list (SGL).

14. The method of claim 11, wherein the control information describes the state of the network.

15. The method of claim 11, wherein the control information describes the state of the application running on the at least one application host from the plurality of application hosts.

16. The method of claim 11, wherein selecting the network path comprises using a routing table.

17. The method of claim 11, wherein the control information identifies an alternate network path route to be used in an event of a network path failure.

18. The method of claim 17, further comprising switching, by the fabric adapter, from the selected network path to an alternate network path route by selecting an entry in a routing table.

19. The system of claim 1, wherein the fabric adapter is configured to retrieve the control information using a scatter gather list element (SGLE) that points to the second buffer, and wherein the SGLE was obtained by the fabric adapter from the at least one controlling host.

20. The method of claim 11, wherein retrieving the control information comprises using a scatter gather list element (SGLE) that points to the second buffer, and wherein the SGLE was obtained by the fabric adapter from the at least one controlling host.

* * * * *